Nov. 2, 1937.   R. H. HELSEL   2,097,485
TICKET ISSUING MACHINE
Filed April 10, 1933   6 Sheets-Sheet 4
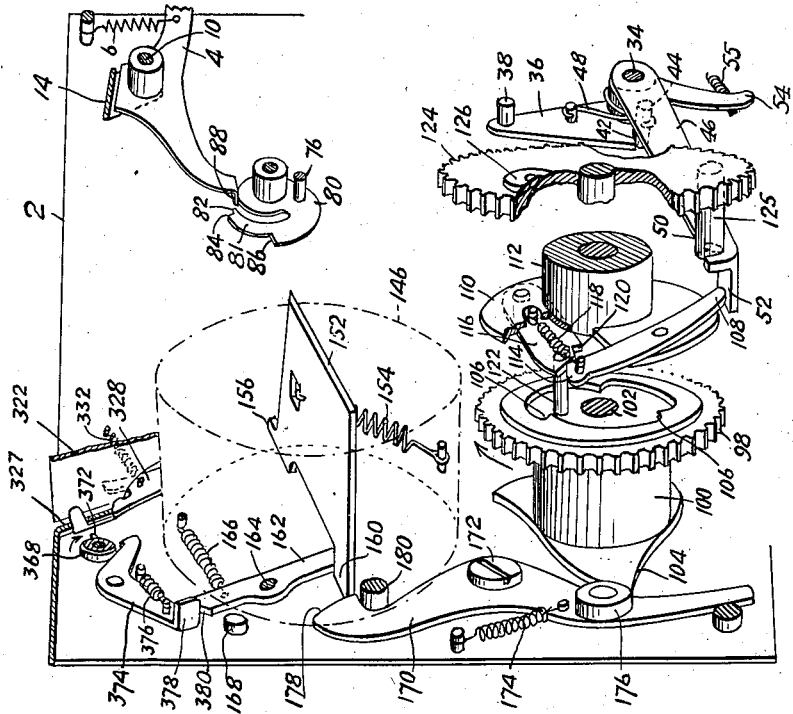
INVENTOR
Reuben H. Helsel
BY
Busser + Harding
ATTORNEYS Nov. 2, 1937.  R. H. HELSEL  2,097,485
TICKET ISSUING MACHINE
Filed April 10, 1933   6 Sheets-Sheet 5

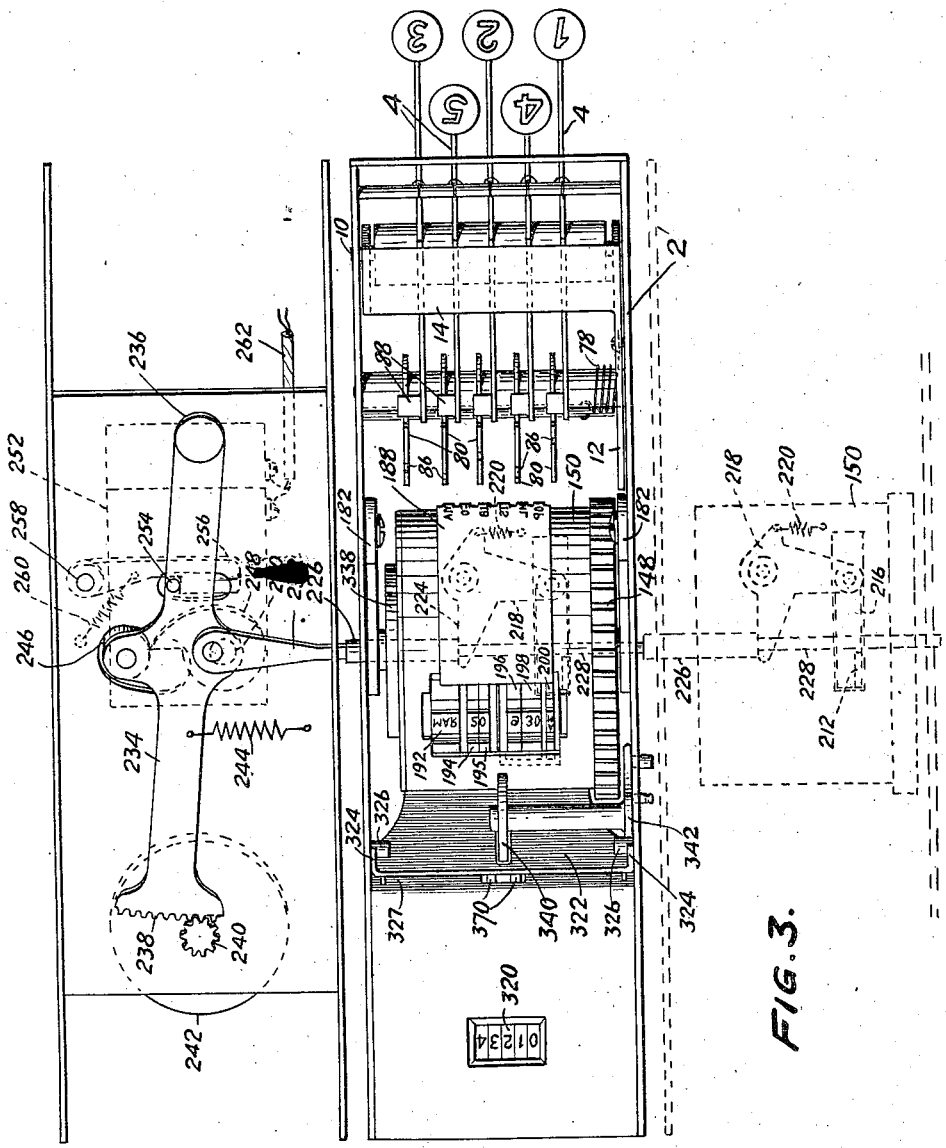

WITNESS:
Rob R Mitchel

INVENTOR
Reuben H. Helsel
BY
Busser & Harding
ATTORNEYS.

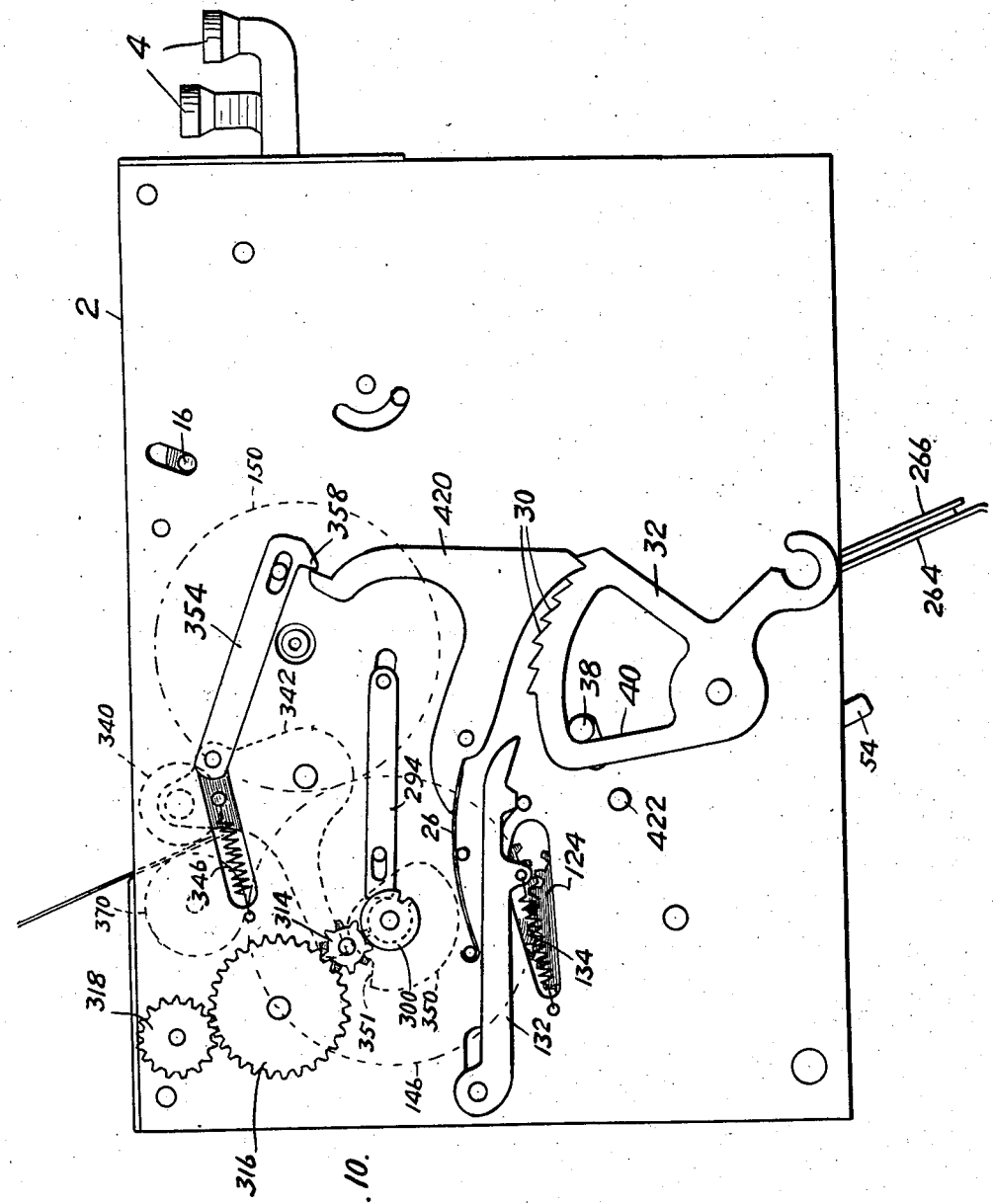

Patented Nov. 2, 1937

2,097,485

UNITED STATES PATENT OFFICE 2,097,485

TICKET ISSUING MACHINE

Reuben H. Helsel, Long Island City, N. Y., assignor to General Register Corporation, Brooklyn, N. Y., a corporation of Pennsylvania Application April 10, 1933, Serial No. 665,386

46 Claims. (Cl. 164—49)

This invention relates to ticket issuing machines and more particularly to machines for issuing tickets or checks for theatres, restaurants, amusements, railways, buses or the like. The invention is primarily directed to a type of mechanism which with slight modifications is adapted for various uses, for example, in the issue of preprinted tickets, or the printing and issuing of tickets accomplished either by selective operation of keys or by automatic operation initiated by the removal of a ticket presented to a patron of, for example, a cafeteria.

The machine of the present invention embodies features described and claimed in my application, Serial No. 620,091, filed June 30, 1932, of which the present application is to be considered in part a continuation.

As indicated above, one of the primary objects of the invention is the provision of a mechanism which will form the basis for various types of machines being transformed into these machines by minor changes involving replacements of only a few parts. From the standpoint of economical manufacture the advantages of this are obvious since the greater number of parts of the mechanism may be made in large quantities to enter into the construction of all of the various types of machines. The advantages of this feature to the purchaser of a machine are also great since he can with minor changes convert the machine for different uses; for example, he can change from a non-printing to a printing machine, he can vary the sizes of tickets to be issued, he can issue the tickets individually or in strips, etc., accomplishing these variations of operation by changes which may be made quite readily. It is impossible to indicate preliminarily the means for accomplishing this object or all of the various modifications which may be made although these will be clear following the description of the machine when they will again be referred to.

It is a further object of the invention to provide mechanism of a type which may be very compactly arranged so that it can be included in a unit occupying a minimum amount of space. The greater number of the parts of the mechanism are formed as flat die castings and are carried directly adjacent side plates of a supporting frame. In fact, the width of the machine is very little more than that absolutely required by the width of the ticket stock which the machine is to handle. That is, the frame of the machine does not extend laterally much beyond the ends of the ticket feeding cylinders and the mechanism for inking the printing cylinder if printing is to be accomplished. By reason of the arrangement of the machine for minimum width the mechanisms may be formed as units which may be associated side by side to provide a bank for the issuance of various types of tickets as is necessary, for example, in the case of theatres where different types of tickets are issued for seats in different parts thereof. The units thus arranged side by side may be driven by a common motor being provided with gears meshing with a shaft extending laterally beneath the units. This arrangement of a plurality of separate units driven by a common motor forms the subject matter of claims presented in my prior application, Serial No. 501,804, filed December 12, 1930.

In connection with the provision of a compact mechanism there has been utilized a clutch arrangement of novel construction adapted to connect the power shaft with any of the individual mechanisms associated therewith. This clutch has a very small axial extent while nevertheless being capable of satisfying the rigid requirements demanded of it.

It is generally desirable that theatre tickets, transfers, or other vehicle tickets or restaurant checks, or the like, be dated; this in the former case being necessary to insure that the tickets are used on the proper date and, in the latter case, being primarily for checking purposes. In the case of transfers or tickets used in vehicles it is also desirable to indicate destinations or transfer points thereon and in the case of theatre tickets it is sometimes desirable to include advertisements or other matters upon the faces thereof. Since the subject matter varies from day to day and since the number of tickets which may be used in any particular day can only be guessed to an approximate degree of accuracy, if the tickets are fully preprinted there is usually a considerable loss. In the present machine in its most elaborate form the tickets may be either fully or partially printed not only with the date and such advertisement or other matter such as destination or transfer points, or the like, but may also have printed thereon the time of issue. The printing arrangement forms a major object of the invention and the specific devices for printing the time of issuance form a further important object.

The mechanism for printing the time on the issued tickets is preferably controlled by a synchronous alternating current motor driven from the usual commercial alternating current supply of controlled constant frequency so that the time printed on the tickets is accurately indicated.

The intervals at which the type faces are changed for printing the time may vary. For example, the interval may be one minute, five minutes or even longer depending upon the particular desires of the user of the mechanism. In the mechanism illustrated herein intervals of five minutes are indicated as such intervals are usually sufficient for taking care of the time limits of the validity of transfers, or the like. Of course the time printing mechanism may be used where it is merely desirable to have a check upon the concentration of patrons throughout any interval.

As has already been indicated the machines in accordance with the present invention are particularly adapted to be associated as a plurality of units. The operating mechanism for changing the time printing devices is so arranged that a single controlling clock mechanism, whether motor or spring operated, will control the time printing devices of all of the units. Specifically this is accomplished by providing plungers extending transversely of the various units and contacting with each other so that impulses received at one end of the series will be transmitted through them for the simultaneous actuation of the time printing devices of each.

Another object of the invention is to provide means for insuring the proper alignment of a ticket strip when severance thereof occurs.

Another object of the invention relates to the provision of means whereby a counter is actuated when and only when a ticket is issued. This counter operating mechanism is furthermore of a type which can be rendered inaccessible so as not to be subject to tampering either by an operator or even by the owner of the machine in case accurate records are required, for example, for governmental tax purposes.

Ticket issuing machines are generally subject to much abuse particularly in the nature of failure to keep the mechanism properly clean and free from the lint and dust resulting from the severance of ticket stock for the issuance of individual tickets. As a result of the fact that certain parts may become jammed by dirt accumulated by reason of neglect, it is undesirable to leave important operations of the machine to the efficacy of springs. This is particularly true of the severing device for cutting the ticket strip to issue separate tickets or strips thereof. In the present mechanism positive means are provided for moving the severing devices positively in both their operating and retracting movements. The mechanism for accomplishing this is such as to properly operate a moving knife although the knife is carried within a rotating cylinder.

In connection with the severing means there is provided an arrangement which in accordance with a further object of the invention may be readily changed to secure the severance of a strip so that either individual tickets may be issued or a plurality of tickets may be issued in the form of a strip.

Still another object of the invention is concerned with the provision of elements whereby the tickets are ejected from the machine with sufficient velocity to carry them freely upon the top plate of the housing so that they may be picked up by a purchaser who need not pull them from the machine. The mechanism for doing this, however, is subject to modification so that when the machine is transformed into the type adapted to issue, say, restaurant checks whenever one is removed, the checks will not be ejected but will remain held so as to control a device for automatically starting the machine when the presented check is removed. Certain elements which have a ticket holding function in the type of machine which issues tickets upon depression of keys are adapted to act to initiate operation of the machine when it is of the restaurant check type. This is in accordance with the general design of a mechanism which has parts capable of functioning for perhaps different purposes in two different types of machines.

Still another object of the invention is the provision of key controlling mechanism for the machine whereby one or more tickets may be selectively issued in a single operation. Mechanism, the nature of which will be hereafter described, is provided for insuring a proper issuing operation in spite of the improper manipulation of the keys.

As has already been indicated, one of the modifications into which the machine may be converted is adapted for the issuance of tickets automatically whenever one is removed. It is also an object of the invention to provide mechanism whereby this is accomplished in a simple and effective fashion.

As in the machine illustrated in my prior application, Serial No. 620,091, an inking device is provided which will be semi-automatically properly located relative to a printing cylinder irrespective of carelessness on the part of an employee who may insert the inking device after replacement of the supply of ink, adjustments or the like. It frequently happens with devices of this sort that employees are careless in replacing parts of the machine which may require periodic removals such as, for example, an ink supplying device. In the present design proper location of the device is substantially insured although its removal is very readily effected. Furthermore, this device which insures its proper location in the machine also takes care of its proper yielding under the action of variations of the type surfaces. In accordance with the invention the inking device is furthermore provided with improved means for securing a proper distribution of ink.

In conjunction with the aligning device which insures that cutting of the ticket strip takes place in proper fashion and also insures that printing is accomplished on a partially preprinted ticket in proper relationship to the printing already thereon means are provided in accordance with the present invention for making adjustments for the proper handling of various sizes of stock and also for the issuance of different sizes of tickets. Adjustable lateral guides serve to secure a proper positioning of stocks of varying widths while the adjustment of the longitudinal aligning means provides for the issuance of tickets of varying lengths or the issuance of double tickets where, for example, it is necessary to issue not only a single ticket but also one or more coupons. In such cases the machine is readily adapted by a change of the printing cylinder to number such movable tickets a plurality of times or print thereon a plurality of indications of the time of issue or the like.

The machine is particularly adapted to issue tickets of the character just indicated, that is, having a plurality of more or less duplicate parts not only because of the fact that two revolutions may be used to accomplish the issue of a single ticket of this type but also because the length of strip fed does not depend upon the pitch diameter of the printing cylinder. Instead, the length which is fed depends upon the total circumferential extent of the printing surfaces upon the cylinder in view of the fact that these surfaces are depended upon in the preferred arrangement to act as feeding surfaces. As a result even though a cylinder of large diameter is standard in the machine, if only a small portion of its circumference carries printing elements the length of the strip advanced in a single revolution will be relatively small. When the machine is of such type that it severs a series of tickets only at the end of a cycle consisting of a plurality of revolutions of the printing cylinder, it will be clear that there can thus be provided an arrangement for issuing a ticket of moderate length by causing two or more rotations of the printing cylinder to take place in the issue of a single ticket. With such arrangement the date and time, for example, may be printed two or more times upon a single ticket. Preprinting of the ticket strip will provide such different legends on the various parts of the ticket as may be required.

The above and other objects of the invention particularly relating to details of construction will become apparent hereafter from the detailed description when read in conjunction with the accompanying drawings in which:

Fig. 1A is a perspective view of an element of the counter controlling mechanism;

Fig. 1B is a sectional view showing the switch controlling means;

Fig. 3 is a plan view of a unit associated with the time printing controlling devices and also illustrating in construction lines an adjacent unit to show the simultaneous operation by the timing mechanism;

Fig. 4 is a rear elevation of the unit;

Fig. 5 is a perspective view with various parts broken away and others omitted to show most clearly certain of the controlling elements and particularly the clutch construction, the various parts being somewhat elongated in an axial direction to illustrate their association;

Fig. 10 is a view corresponding to Fig. 1 showing a modified type of machine, operation of which is initiated by removal of a check rather than by depression of keys.

Referring first to the modification of the machine illustrated in Figs. 1 to 9 inclusive, namely that modification adapted to issue tickets upon the selective depression of keys, there is provided a frame indicated in a general fashion by the numeral 2 consisting primarily of side plates in and on which various elements are mounted, these plates being suitably cross-connected to form a unitary housing. As will be pointed out later this housing is in such form that the mechanism carried thereby provides a complete unit which may be associated with others to form a bank capable of issuing a plurality of different forms of tickets. A number of these machines associated together form a complete ticket issuing unit for a theatre or the like where it is required that various types of tickets be issued. A common motor may suffice to drive all of the units.

Figure 1:
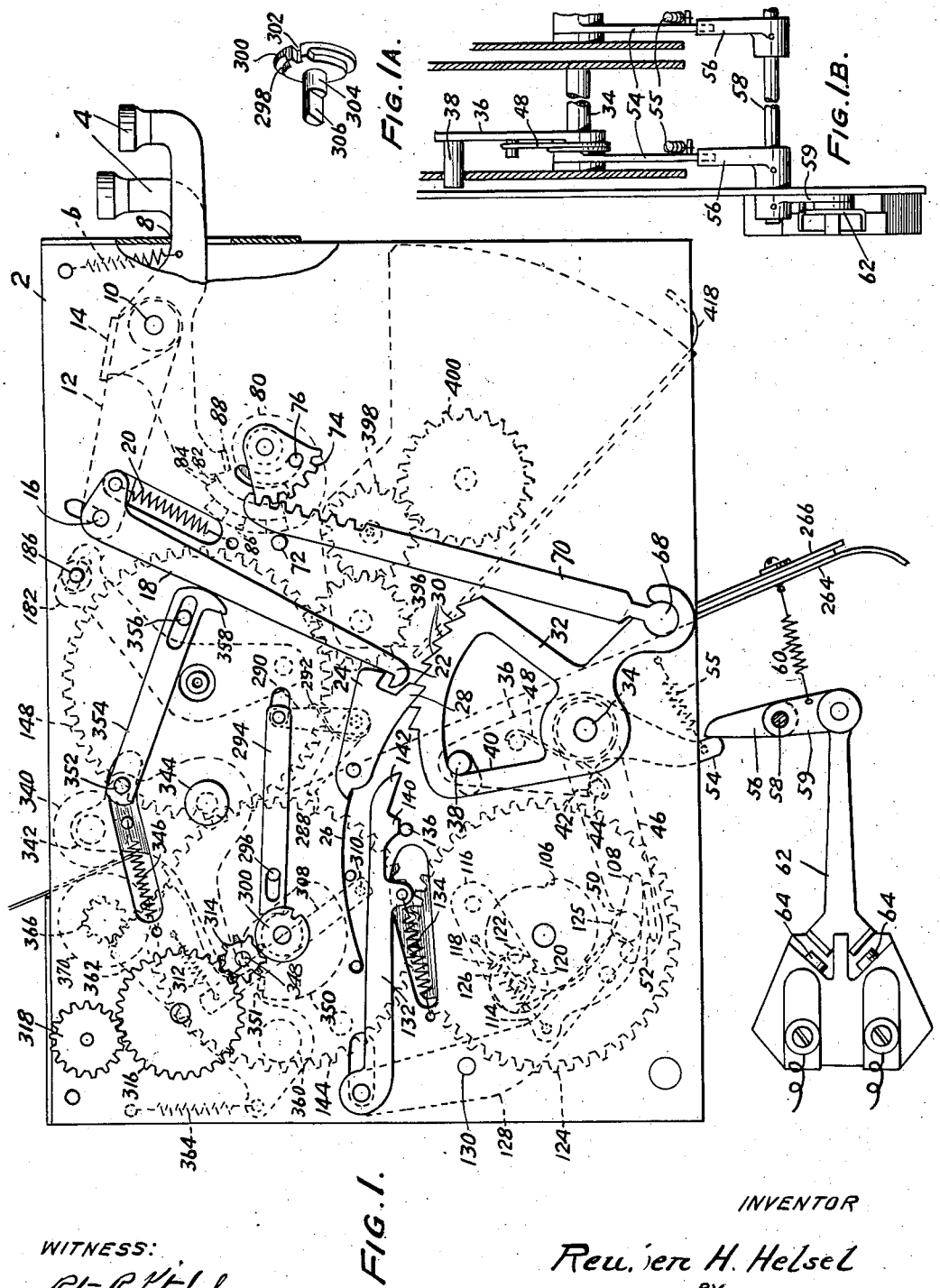
Fig. 1 is a side elevation of a ticket issuing unit partially broken away, this figure and those figures up to and including Fig. 9 being directed to a type of mechanism adopted for the selective issue of one to five tickets by key operation.

Referring particularly to Figs. 1 and 3 there are provided a plurality of keys indicated at 4 individually urged upwardly by springs 6 connected between the keys and a cross rod carried by the frame. The upward movement of the keys is limited by contact with the upper edge of an opening 8 in the front plate of the machine. If desired, this opening may have associated therewith one of the well known types of devices for preventing the simultaneous depression of a plurality of keys. The various key levers 4 are journalled upon a fixed shaft 10 on which is also journalled a lever 12 provided with a transverse plate indicated at 14 overlying all of the key levers so that when any one of them is depressed the lever 12 will be rocked in a clockwise direction as viewed in Fig. 1 raising the link 18 which is pivoted to the lever 12 at 16. The link 18 is urged downwardly and also in a clockwise direction as viewed in Fig. 1 by a light spring 20. The lower hook end 22 of the link 18 enters an opening in a pivoted detent 24 which is urged by a leaf spring 26 in a clockwise direction to bring its active end 28 in engagement with ratchet teeth 30 formed on a rocking segment 32 which is journalled upon a fixed shaft 34. Also journalled upon this fixed shaft 34 is a lever 36 which carries a pin 38 engageable with the internal edge 40 provided by an opening in the segment 32. The lever 36 has an edge portion indicated at 42 adapted to engage a pin 44 carried by an arm 46 also journalled upon the fixed shaft 34. A spring 48 reacts between the two levers 36 and 46 holding the edge 42 in engagement with the pin 44. The spring 48 is a strong one so that in general the two levers 36 and 46 act as a unit forming a single bell crank. The lever 46 is provided with a socket indicated at 50 and also a lateral extension indicated at 52.

The lever 36 has a depending extension 54 connected with a strong spring 55 which urges the lever in a counterclockwise direction. The arm 54 is arranged to engage an upwardly extending arm 56 carried by a transverse shaft 58 to the end of which there is secured a depending arm 59 acted upon by a spring 60 to rotate the shaft 58 in a counterclockwise direction as viewed in Fig. 1. To the lower end of the arm 59 is connected the contact member 62 adapted to bridge the yielding contacts 64 and thereby close the electrical circuit through the motor 66. In the preferred form of device a plurality of ticket issuing units are arranged to be included in a common casing. To each of these units there corresponds one of the arms 56 cooperating with the arm 54 of that unit. The engagement between the arms 54 and 56 is effected automatically as the units are dropped into position in the case, this action also serving to mesh the units with individual driving gears as will be indicated more clearly hereafter. The connections just indicated provide for the closure of the switch 62 when any one of the units is set into operation. Also the connections provide that if two units are simultaneously in operation the switch will remain closed until the latter of the two comes into its final position. The spring 60 serves to urge the switch member 62 to open position, the switch member being closed by the counterclockwise rotation of the arm 54 of any of the units. The switch illustrated is preferably of the form described and claimed in my Patent 1,893,027 dated January 3, 1933.

The segment 32 also has a cylinder and socket connection indicated at 68 with a rack 70 provided with teeth at its upper end engaging the teeth of a segment 74 the rack being held in engagement with these teeth by a guiding pin 72. A pin 76 extending inwardly through the side plate of the frame is urged in a clockwise direction by a spring 78 and passes through openings in selectors 80 so as to correspondingly move these selectors which are journalled upon a fixed transverse shaft, one of these selectors being provided in combination with each of the key levers. The form of these selectors is most clearly illustrated in Figs. 2, 3, and 5 from which it will be seen that each of them is provided with an annularly extending portion 81 providing an undercut. At the end of this extension 81 of each of the selectors there is a lip 82 radially outward of which there is an abutment surface 84. Each of the selectors corresponds to the extent already described, the abutments 84 occupying the same angular positions in all of them. The selectors differ among themselves however in the positions of selecting abutments indicated at 86 which in the present instance occupy five different positions on the five selectors corresponding to the five keys which are illustrated. The abutment on that selector which corresponds to the key adapted to issue a single ticket occupies the foremost position while the abutment on that selector associated with the key adapted to issue five tickets occupies the rearmost position, the others occupying corresponding spaced positions between these extremes. Each of the key levers is provided with a laterally extending end 88 engageable with the lip 82 and the abutments 84 and 86 of its corresponding selector. The undercuts provided inwardly of the extensions 81 receive the laterally turned ends 88 of the keys which are not depressed in any cycle of operation.

The initiation of the operation of the machine may now be briefly described since the parts involved therein have already been discussed. When any of the keys 4 is depressed the laterally turned end 88 thereof is raised, nothing can occur until it rises above the lip 82. If it should happen that the parts are prematurely released before the key is depressed to an extent causing it to clear the abutment 84 the corresponding selector 80 may rock clockwise as viewed in Fig. 2 so that the abutment 84 engages the turned end 88. The movement thus obtained however will not be sufficient to produce a starting of the machine but the provision of the lip will insure not only that the key cannot move upwardly to its initial position but also that no other keys may be depressed. There is no other alternative left but a more complete depression of the key to bring its turned end 88 to a position where it will eventually clear the abutment 84 so as to be engageable by an abutment 86. As the key reaches a position clearing 84 the lever 12 whose actuation is common to all of the keys 4 will raise the link 18 so that its hooked end 22 will disengage the detent 24 from the teeth 30. The spring 55 together with the spring 78 will now cause the segment 32 to rock counterclockwise. The extent of this counterclockwise movement is limited by engagement of the abutment 86 of the selector corresponding with the depressed key with the end 88 of that key; that is, the segment 32 will have an angular movement whose extent corresponds to the number of tickets being issued. Simultaneously the switch 62 will close energizing the motor 66.

Continuing now with a description of the parts, the motor 66 is provided with a pinion 90 engaging a gear 92 affixed to shaft 94 to which are secured a plurality of pinions 96 one corresponding to each of the associated units. Each of the units contains a gear 98 which may be dropped into mesh with the corresponding gear 96 when the units are placed in position in their common housing. It may be noted that the arrangement for controlling the switch permits this, since, as any unit is dropped into place there occurs not only meshing of the gears 96 and 98 but also engagement of the arm 54 of the unit with the corresponding arm 56.

The gear 98 of each unit is secured to a hub 100 journalled upon a fixed shaft 102 carried by the side plates of the frame. This hub 100 also carries a cam 104 the purpose of which will be hereafter described. When the machine is in stationary condition the gear 98 is not clutched with the mechanism of the unit. Accordingly even though the gear 98 of an inactive unit is rotated by reason of operation of another unit, this rotation takes place idly, the cam 104 being at this time out of engagement with any follower, as will be evident hereafter.

The gear 98 may be clutched to drive the mechanism by the devices indicated most clearly in Fig. 5. The face of the gear 98 is provided with a clutch member having a cam-like internal surface provided with sockets indicated at 106. To insure more immediate clutching and more rapid starting of the machine, a plurality of sockets are preferably provided, this number being in the present instance three so that the gear 98 need make no more than one-third of a revolution prior to engagement of the clutch.

A hub 112 is journalled on the fixed shaft 102 and carries a plate 110 on which is pivoted a lever 108 having a head 114 engageable with a cam surface formed at the end of a lever 116 also pivoted to the plate 110. A spring 118 normally urges the head 114 of the lever 108 in such direction as to tend to cam the lever 116 outwardly and thereby cause the pin 122 carried by the lever 116 to engage within one of the sockets 106. The spring 118 is sufficiently strong to accomplish this whenever the lever 108 is free to move in a clockwise direction as viewed in Fig. 1. If movement does occur tending to engage the pin 122 within one of the sockets, the head 114 eventually moves into a notch 120 at the inner portion of the free end of the lever 116 tending to prevent any movement inwardly even though considerable force may be exerted upon the pin 122. In other words, the mutual actions of 108 and 116 become of an irreversible nature so that positive clutching is insured.

When the machine is in its stationary condition a pin 125 carried by a gear 124 secured to the hub 112 rests within the depression 50 formed in the lever 46, this being the determining factor fixing the rest position of the parts. At this time the extension 52 of the lever 46 cams the lever 108 in a counterclockwise direction against the tension of spring 118 so that the clutch is disengaged. It will be noted that at this time the lever 46 is in its extreme clockwise position due to the fact that the spring 48 is effectively much stronger than the spring 118 and the pin 38 is being held in its extreme righthand position by reason of the fact that the segment 32 is held by the detent 24 as illustrated in Fig. 1.

In the above brief description of the initiation of operation of the machine it was pointed out that the segment 32 rocks to the left. When this occurs the pin 38 is released by the arm 40 and consequently the arm 46 drops releasing lever 108 and causing an engagement of the clutch so that the gear 124 will be driven. It is from this gear 124 that rotary movements are imparted to the ticket feeding and printing elements.

The gear 124 carries a roller 126 arranged to engage the follower arm of a lever 128 pivoted at 130 to the frame. A pawl 132 is pivoted to the upper arm of this lever being urged by a spring 134 to a retracted and downward position bringing a cam projection 140 into engagement with a guiding pin 136, thus causing its active end 142 to be raised to a positon out of the path of the teeth 30 when these teeth move to the left during the initial swinging of the segment 32. Upon each revolution of the gear 124 the lever 128 is rocked and the pawl 132 is given a working stroke to the right, riding off the pin 136 downwardly into engagement with the ratchet teeth 30, imparting step by step movements thereto and thereby restoring the segment 32 to its initial position.

The movements imparted by the pawl 132 are of an extent tending to rock the segment upon each movement of the pawl through an angle slightly greater than the angle between the adjacent teeth. Since the initial release of the segment 32 tends to move the segment through an angle corresponding to that of a number of teeth the same as the number of tickets to be issued and since the gear 124 rotates once for the issue of each ticket the segment 32 is restored to its initial position after the issuance of the required number of tickets.

The gear 124 meshes with a gear 144 secured to the backing cylinder 146 which is journalled in the side plates of the frame. A gear 148 meshes with the gear 144 and is carried by the printing cylinder 150.

Figure 2:
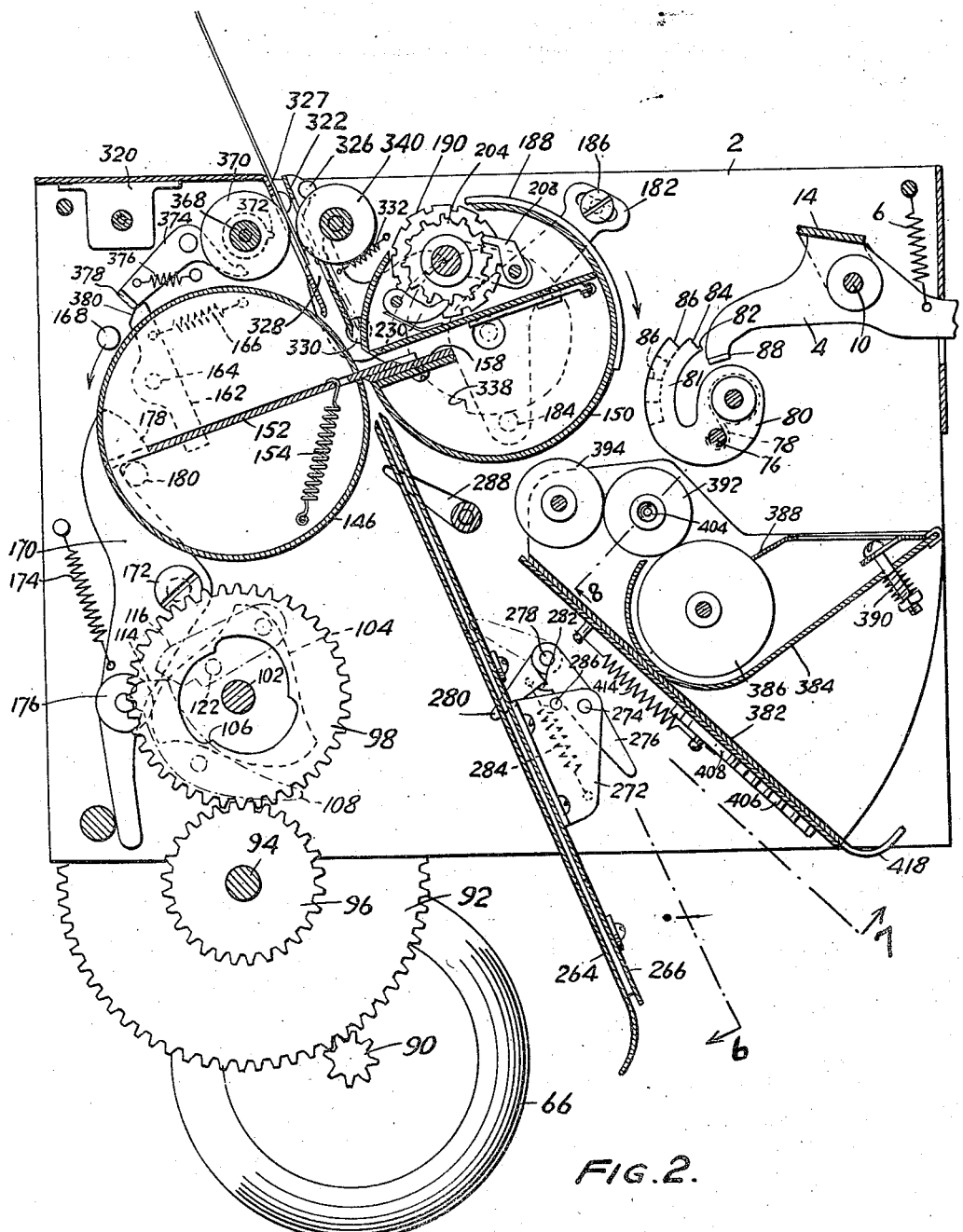
Fig. 2 is a vertical section of the unit taken transversely to the driving shaft and showing the connections of the unit with a driving motor and transverse shaft common to a plurality of units.

The backing cylinder 146 has slidably mounted in suitable grooves in its ends a movable knife blade 152. This blade is mounted so as to have some freedom of lateral movement at its end which extends outwardly of the backing cylinder and is yieldingly urged towards a downward position as viewed in Fig. 2 by a spring 154. The blade 152 is provided with an extension 156 most clearly illustrated in Fig. 5. A cooperating fixed blade 158 is provided in the printing cylinder. Prior to the time when a cutting stroke of the moving blade 152 occurs, and as the printing cylinder approaches its final position the extension 156 is engaged by the fixed blade 158, and since the extension 156 extends radially outwardly from the center of rotation of the cylinder 146 beyond the pitch line of the gear 144, the blade 152 will be given a slight movement in advance of the cylinder 146 against the tension of spring 154 thereby preventing the cutting edge of the movable blade from being dulled by contact with the fixed blade. At the time cutting takes place the blades are properly aligned as indicated in Fig. 2 so that a proper cutting action is effected, the edge of the movable blade moving in the plane of the upper surface of the fixed blade.

In the present machine the spring 154 does not serve to actuate the blade 152 in either its cutting or retracting movements. The movable blade is positively moved in both directions. The retracting movement is imparted by engagement with an extension 160 thereof of the lower end of a lever 162 pivoted at 164 to the end of the backing cylinder and arranged to engage a fixed pin 168 shortly after initial movement of the cylinder takes place. A light spring 166 holds the lever 162 in engagement with 160 this spring, however, being too light to move the blade.

The cutting movements of the blade are imparted by a lever 170 pivoted at 172 to the frame and urged in a clockwise direction by a comparatively light spring 174 which also is ineffective to cause movement of the blade. The lever 170 is provided with a cam following roller 176 engageable with the cam 104 which is provided with three lobes as illustrated corresponding to the three sockets 106 of the clutch. The upper end of the lever 170 is provided with a cam surface 178 which is engageable with a pin 180 carried by the cylinder 146. The operation of these various parts will be hereafter described.

To provide an adjustment for the printing cylinder 150 levers 182 are pivoted at points 184 to the side plates of the frame and provide journals for the trunnions of the printing cylinder. These levers 182 are held in adjusted positions about their pivots 184 by screws 186 passing through slots in the levers 182 and clamping them to the side plates. By reason of this arrangement the approach of the printing cylinder to the backing cylinder may be adjusted.

The printing cylinder carries one or more replaceable type plates indicated at 188. In the present instance it also carries a dating head indicated at 190. This head, which may be of any desired construction, is provided with a plurality of cylinders indicated at 192, 194, 195, 196, 198, and 200. The first of these is provided with type so that it may print the month. The next two are adapted to print the day of the month. The three of these are arranged to be moved by hand, being reset daily. The last three, however, are automatically actuated and comprise the cylinders 196 carrying numbers representing the hours, 198 carrying numbers representing, say, every five minutes of the hour, and 200 carrying alternate type surfaces indicating "A. M." and "P. M." Associated with each of the last three cylinders is a ratchet plate 204 moving with the corresponding cylinder, all of the cylinders being journalled upon a cross shaft 202 fixed in the printing cylinder. Pawls 206 pivoted at 208 upon a rocking lever 210 journalled on the shaft 202 are arranged to advance the three cylinders when the lever 210 is oscillated. The arrangement of pawls and ratchet is conventional and will not be discussed in detail. It is only necessary to say that whenever the arm 210 is rocked the minute cylinder is advanced one step, this rocking occurring in the present instance once every five minutes so that there are twelve printing surfaces upon the cylinder 198. Upon each revolution of the minute cylinder 198 the pawl 206 corresponding to the hour cylinder 196 becomes active to advance the hour cylinder one step, this pawl having previously been held inactive by reason of the shallow depth of the spaces between the teeth of the ratchet associated with the minute cylinder. Again every time the hour cylinder completes a revolution the pawl 206 associated with the semidiurnal cylinder 200 is advanced one step to change the designation from A. M. to P. M., or vice versa.

Figure 9:
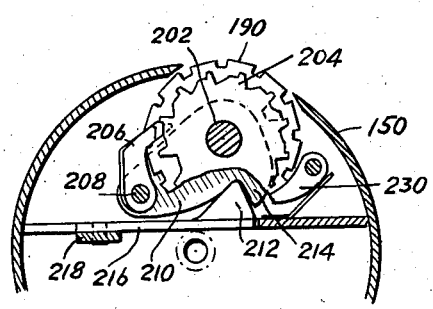
Fig. 9 is a transverse section through a portion of the printing roller illustrating the mode of operation of the time printing mechanism.

The lever 210 is rocked through the action of a cam 212 which, when it moves to the left as viewed in Fig. 9, gives the pawls 206 their active movements and on its return stroke retracts these pawls by engagement with the tail 214 provided on the lever 210. The pawls are thereby advanced and retracted positively. The cam 212 is carried by a slide 216 connected to a lever 218 pivoted on a web within the printing cylinder and urged in a clockwise direction as viewed in Fig. 3 by a spring 220. An arm 224 of the lever 218 is engageable by a shoulder of a pin 226 which projects through the hollow trunnions of the printing cylinder extending completely through the frame to engage the end of another pin 226 in an adjacent unit as indicated in Fig. 3, a portion 228 of each pin being reduced in size to provide in a simple fashion the actuating shoulder which, it will be noted, extends completely about the pin. It may be noted that the cylinders 196, 198 and 200 are held against reverse movements by pawls 230 spring pressed into engagement with the ratchet teeth.

Axial movements must be imparted to the pins 226 arranged in series in the adjacent units in order to rock the levers 210 and thereby advance the time cylinders. To accomplish this there is provided an arrangement of the type indicated in Fig. 3. A plunger 232 is guided through a side plate to engage the end of the nearest pin 226. This plunger 232 is pivoted to a lever 234 which is pivoted to the frame as indicated at 236. The lever 234 at its free end is formed as a gear segment 238 meshing with the pinion 240 secured to a shaft which carries a flywheel 242 in the form of a metallic disc. A spring 244 normally urges the lever downwardly as viewed in Fig. 3 urging a cam follower 246 into engagement with a cam 248 secured to a shaft 250 which is driven at a proper slow speed by a clock mechanism 252. In the present instance the cam 248 would be driven so as to make one revolution in five minutes. The lever 234 carries a downwardly extending pin 254 engageable with a lever 256 pivoted at 258 and urged in a clockwise direction as viewed in Fig. 3 by a spring 260.

In the operation of this device the cam 248 rotates clockwise, first moving the lever 234 against the tension of spring 244 until the pin 254 clears the hook of the lever 256. The lever 256 then snaps to the left whereupon the follower 246 is released by the cam 248 with the result that counterclockwise movement of the lever 234 is then prevented only by engagement of the pin 254 with the hook of lever 256. As the cam continues to revolve it engages lever 256 rocking it counterclockwise and eventually releasing the pin 254 so that the spring 244 will move the lever 234 counterclockwise thereby imparting a working stroke to the plunger 232. The arrangement indicated provides a rapid movement of the plunger 232 at a predetermined time even though the interval between the strokes of this plunger may be quite long. The flywheel 242 is provided to supply inertia so that the plunger 232 does not have too rapid a stroke and will accordingly properly operate the pawls 206. Following this release of the lever 234 it is again slowly moved to its tensioned position preparatory to a subsequent movement of the plunger.

The arrangement which has been described is particularly adapted for operation by an electrical clockwork mechanism driven by a synchronous motor. The leads to this motor are indicated at 262. Since, in general, at the present date alternating current is available in most localities at a very closely controlled frequency so that a synchronous motor driven clockwork mechanism will keep extremely accurate time, and since the ticket issuing mechanism would, in case alternating current is available, be driven by an alternating current motor, the wires 262 may be directly connected to the source of current supply of the motor. There is thereby not only obtained great accuracy of timing but also a convenient arrangement which requires no winding and no care except preliminary setting when the mechanism is placed in operation. If such controlled alternating current is not available there may of course be provided a spring operated clockwork mechanism or an electrically driven clockwork mechanism in which a motor is used to automatically wind up a spring. A synchronous clock drive however is greatly to be preferred since smoothness and accuracy are thereby obtained and suitable gearing may be readily provided to insure the proper speed of rotation of a mechanism such as the cam 248.

In place of the mechanical arrangement shown numerous other means may be provided to actuate the printing mechanism even though the plungers 226 are used. For example, a plunger of an electromagnet may engage the nearest of the plungers 226, the electromagnet being energized at suitable intervals. The plunger operation of the time printing mechanism is very desirable because of its applicability to the synchronous operation of a plurality of ticket issuing units in the manner indicated.

The subject matter just described is claimed in my divisional application Serial No. 44,647, filed October 12, 1935.

Figures 6, 7:
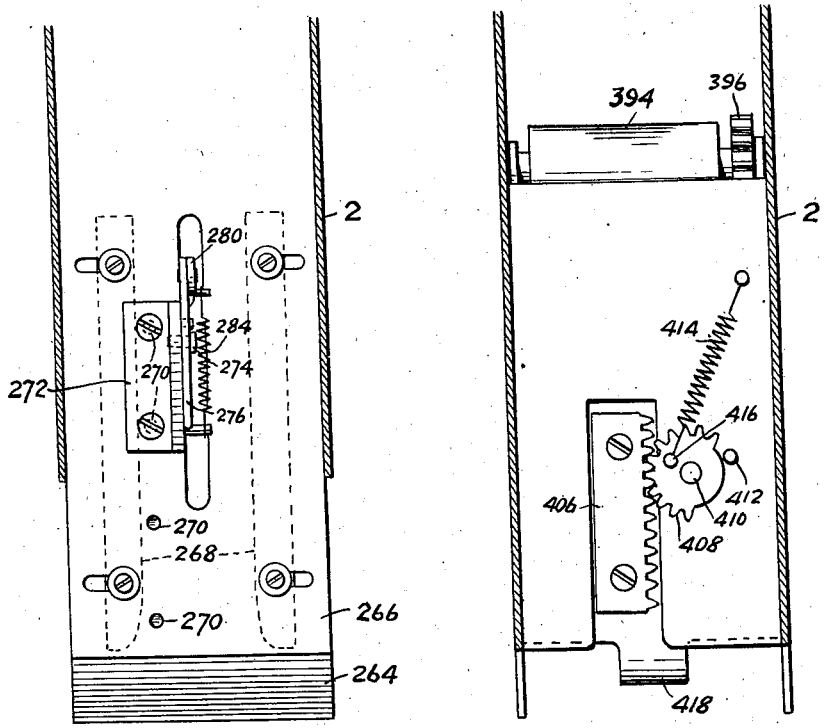
Fig. 6 is a fragmentary sectional view taken on the plane indicated by the line 6 in Fig. 2.
Fig. 7 is a sectional view taken as indicated by the line 7 of Fig. 2.

Referring now more particularly to Figs. 2 and 6 there are indicated therein the strip guiding and controlling devices. The ticket strip is led through a guide comprising a bottom plate 264, a top plate 266 and adjustable side guide members 268 which as indicated in Fig. 6 may be adjusted laterally to take care of various sizes of ticket stock.

The top plate 266 is provided with a plurality of tapped holes 270 receiving screws adapted to clamp to the top plate a support 272 on which is pivoted at 274 a lever 276 having a depending arm, which may be engaged by the finger of an operator for a purpose hereafter described, and an upwardly extending arm to which is pivoted at 278 an engaging finger 280 whose counterclockwise movement as viewed in Fig. 2 relative to lever 276 is limited by engagement with a stop 282 against which it is urged by a spring 284. By reason of the use of the stop 282 the spring also has a tendency to rotate the lever 276 counterclockwise which counterclockwise movement is limited by a stop pin 286.

The finger 280 is arranged to engage within the holes of a ticket strip whenever the ticket strip is in its proper position. When the ticket strip is inserted the finger 280 may be raised by depression of the downwardly extending end of the lever 276 so that it offers no frictional resistance to the advance of the ticket strip. As the ticket strip is fed upwardly, if the finger 280 engages its surface as indicated in construction lines it acts as a detent preventing retrograde movement. When a hole in the ticket strip is entered by the finger 280, if the strip is released the spring 284 will tend to move it backwardly until the finger assumes a position in contact with the stop 282 and the lever 276 engages the stop pin 286. There is thus provided a definite accurate alignment for the strip. The various tapped holes 270 are provided at such positions that the support 272 may occupy three different positions so that the finger is operable to align strips in which the holes are three different distances apart. If the holes are half these distances apart it will be obvious that alignment will also be effected so that with the construction illustrated tickets of six different sizes may be properly aligned. Specifically, the alignment is necessary before the operation of the knife to sever the strip, the alignment being provided to insure that the severance takes place between tickets along the transverse axes of the openings therein.

Further up along the path of the ticket strip there is provided a finger 288 which normally engages the surface of the ticket strip but which may drop through aligned slots in the plates 264 and 266. This lever 288 is carried by a hub to which is secured an upwardly extending arm 290 (Fig. 1). A spring 292 urges the finger 288 and the arm 290 in a counterclockwise direction so that unless a ticket is present in the guideway the finger 288 will drop through the guide plates and the arm 290 will move a link 294 to the left, this link being guided by a pin indicated at 296. When the link 294 is in its extreme lefthand position as viewed in Fig. 1, it enters a groove 298 in a disc 300 this groove 298 having its continuity interrupted by radially extending walls providing a slot 302 extending through the thickness of the disc. These boundary walls are in the form of gear teeth. The disc 300 is carried by a stem 304 which is provided with a flat 306. The stem 304 extends through the hollow trunnion of the backing cylinder 146 and the flat 306 is engaged within the cylinder 146 by a lever 308 pivoted at 310 to the cylinder and urged in a clockwise direction as viewed in Fig. 1 by a spring 312 connected between its free end and the end of the cylinder. There is thereby provided a yielding connection between the disc 300 and the backing cylinder. Since the spring 312 is a fairly strong one, in general, when the cylinder rotates the disc 300 will move therewith as a unit. This will occur whenever a ticket is present in the guideway so that the link 294 occupies a forward position and does not engage within the groove 298. However, if there is no ticket present within the upper portion of the guideway immediately below the cylinders then the link 294 will occupy a rear position so that rotation of the disc 300 is positively prevented. In such case if the backing cylinder rotates, the lever 308 will yield due to the cam action of the flattened portion of the stem 304 and a complete rotation of the backing cylinder may take place without rotating the disc 300.

The disc 300 forms the driving member of a Geneva mechanism the driven member of which is indicated at 314 and comprises two sets of teeth the outermost of which merely prevent rotation of the gear 314 by straddling the periphery of the disc 302, while the inner set of which are acted upon by the inner portions of the walls of the slot 302 which slot is provided for the free passage of the outermost teeth. In the present instance the pinion 314 is provided with five teeth of each type so that upon each revolution of the disc 300 this gear 314 is rotated one-fifth of a revolution. Both sets of teeth of the gear of the 314 mesh with teeth of a gear 316 which in turn meshes with a pinion 318 carried by the operating shaft of a counter 320.

The arrangement just described is important in cases where accurate records of the operation of the machine are either necessary because of legal requirements or merely desirable for accounting purposes. The counter will not operate unless a ticket is in position to be delivered. Furthermore the arrangement is such that tampering with the counter is substantially impossible unless access is obtained to the mechanism between the side plate of the machine and a cover plate which is not illustrated but which serves to maintain all of the parts indicated in full lines in Fig. 1 upon their pivots and in proper relative positions, all of these parts being of thin material and desirably formed as die castings. If this outer plate is locked in some fashion to the side of the machine then it is practically impossible to change the reading of the counter. As a result there is an insurance of accuracy in the record of the issued tickets.

The means for insuring the proper delivery of tickets is illustrated most clearly in Figs. 1, 2, 3, and 5. A plate 322 is provided with flanges 324 having depressions therein engaging pins 326 which serve for the pivotal support of the plate, the plate being held in contact with these pins by spring ears extending from a plate 327 which forms the lower member of the guide for the discharging ticket. The plate 322 has its downward termination adjacent the zone of closest approach of the two cylinders. A lever 328 has a forked upper end engaging the plate, this lever being pivoted at 330 so that a clockwise movement of the lever serves to move the lower end of the plate 322 towards the printing cylinder 150. The lever 328 is urged in a clockwise direction by a spring 332, its movement being limited by engagement of its laterally extending arm with the periphery of cam 338 secured to the printing cylinder, which cam causes the plate 322 to move away from the printing cylinder through the action of the lever 328. This arrangement is used to insure a stripping of the ticket from the type cylinder so that it will be properly discharged and will not tend to adhere to the cylinder and be carried around thereby. Since the printing plate indicated at 188 is depended upon to feed the ticket by clamping the ticket against the surface, preferably a slightly yielding one, of the backing cylinder 146, the plate 322 is moved by the action of spring 332 towards the cylinder 150 just prior to the time the plate 188 moves about to printing position and is then moved away from the cylinder to permit the plate 188 to pass. It may be pointed out that the feed of a ticket is not continuous, feed only taking place when the ticket is engaged by type.

A presser roller 340 is arranged to project through an opening in the plate 322 and also through an opening in the plate 327 between flanges of a roller 370 in case no ticket is in a position such as that illustrated in Fig. 2. The roller 340 is carried by a stem secured to a lever 342 illustrated most clearly in Fig. 1. This lever 342 is pivoted at 344 to the side plate and is urged in a counterclockwise direction by a spring 346. Its end 348 is engageable with a cam 350 the timing of which will be hereafter described, the arrangement being such that lever 342 engages the low part of the cam only when no ticket lies between rollers 340 and 370; that is, when roller 340 lies between the flanges of roller 370. Pivoted to the lever 342 is a link 354 guided by a pin and slot connection 356 and provided with a hook end indicated at 358 which hock has no function in the present machine but has in a modified machine into which the present machine may be converted. The link 354, however, has the function of engaging the link 18 for a purpose hereafter described.

Pivoted to the side plate of the frame at 360 is a gear segment 362 urged in a clockwise direction as viewed in Fig. 1 by a spring 364. The teeth of this segment mesh with a pinion 366 carried by the hub 368 of the roller 370 which is provided with a plurality of flanges between which the roller 340 may drop (see Fig. 3). The segment 362 as well as the lever 348 engages the cam 350 which is provided with a ledge 351 off which the segment may drop under the action of the spring 364. As best shown in Figs. 2 and 5 the hub 368 carries a disc having a projection 372 which is engageable by the hook end of a lever 374 urged in a counterclockwise direction as viewed in Fig. 2 by a spring 376. A turned end 378 of the lever 374 acts as a cam follower engaging the outer cam shaped end 380 of the lever 162 which has been heretofore described. When the machine is in its initial position illustrated in the figures the follower 378 rests upon the cam portion 380 having been tripped from a position in which it engaged the projection 372. The purpose of this arrangement will be made clear hereafter.

Figure 8:
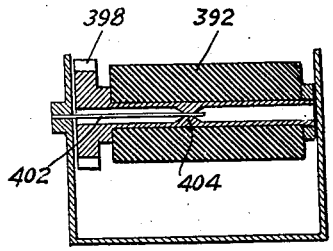
Fig. 8 is an axial section through an intermediate roller of the inker taken on the plane indicated by the line 8 in Fig. 2.

An inker is provided to ink the various type elements carried by the cylinder 150; this inker comprises a housing 382 guided in the machine frame and including an ink well 384 into which extends a transfer roller 386 engaged by a scraper 388 urged by a spring 390 against the roller. The ink from the roller 386 is transferred to an intermediate roller 392, which serves to produce a uniform distribution of ink, and is thereby transferred to the inking roller 394. A train of gears 396, 398 and 400 connected respectively to rollers 394, 392 and 386 tend to insure positive rotation of these rollers, the gear 396 meshing with the gear 148 carried by the printing cylinder. The meshing of the gears 396 and 148 insures the proper cooperative positions of the type and the inking roller 394. In order to insure a uniform contact of the intermediate roller 392 and the rollers 386 and 394 the intermediate roller is preferably mounted as indicated in Fig. 8. As shown therein the gear 398 is provided with a hollow hub on which the roller 392 is carried. This hub is supported upon a spring 402 projecting inwardly from the housing and engaged within a small opening in the hub indicated at 404. The spring is slightly distorted from the position it would freely assume so that contact of the rollers of a universal type is provided with the result that they are substantially self-aligning.

To provide for ready removal and replacement of the inker it carries on its under side a rack 406 meshing with a gear segment 408 pivoted at 410 whose movements in a counterclockwise direction as viewed in Fig. 7 are limited by engagement of its end tooth with a stop pin 412. A pin 416 carried by the segment is engaged by a spring 414 connected to a fixed pin which spring in the extreme movements of the segment will move from one side to the other of the center of rotation 410. As a result, when the inker is in its operative position the spring is tending to move the gears 396 and 148 into mesh thereby yieldingly urging the roller 394 into contact with the type. If the inker is pulled outwardly against the tension of the spring by taking hold of the upturned finger engaging portion 418 the spring eventually aids such movement and forces the inker outwardly. The segment then remains in position to receive the inker when it is replaced.

Having now described the parts of the machine illustrated in Figs. 1 to 9 inclusive the operation will be described in connection with the issuance of two tickets since this operation will indicate the various events occurring in the issue of either one ticket or more than two tickets. Certain of the details involved in the initiation of a cycle of operations have already been briefly described. However, they will be to some extent repeated in connection with the complete operation.

Upon depression of the key 4 which is adapted to control the issuance of two tickets, the link 18 is raised by the engagement of the key with the member 14 thereby freeing the detent 24 from the ratchet 32. The ratchet revolves counterclockwise until its motion is limited by the engagement of the corresponding abutment 86 with the portion 88 of the depressed key. In the present instance this means that the ratchet 32 will have moved counterclockwise through an angular distance approximately equal to twice the angular spacing of the teeth 30. As this movement of the ratchet occurs the switch 62 closes starting the motor.

The pin 38 is released to its full extent when the ratchet has moved counterclockwise through the angular spacing of a single tooth 30. Accordingly, the arm 46 rocks downwardly releasing both the pin 125 carried by the gear 124 and the lever 108 of the clutch. As the lever 108 is released the spring 118 pulls it clockwise as viewed in Figs. 1 and 5 causing it to cam the lever 116 upwardly and engage the clutch pin 122 in one of the sockets 106. Since the motor is now energized and movement of the gear 98 may have already been initiated, driving of the hub 112 in a clockwise direction begins so that the gear 124 will rotate the gear 144 causing movements of both the backing and printing cylinders.

Referring now more particularly to Fig. 5, as motion starts the end 380 of the lever 162 rides from beneath the turned end 378 of the latch lever 374 permitting it to swing counterclockwise until its motion is limited by engagement of its hook carrying arm with the hub 368. Simultaneously with this event the extension 169 of the knife passes below the cam end 178 of the lever 170 whereupon the upper end of the lever 162 engages the fixed pin 168 so that 162 is rocked clockwise retracting the knife. Accordingly irrespective of the strength of the spring 166 the knife is positively retracted. The spring 166 however may be sufficiently strong so that retraction of the knife occurs even prior to engagement of the lever 162 with the pin 168. At any rate the spring 166 retains the lever in its clockwise position until it is positively disturbed from this position. This is important in view of various events which occur hereafter.

As rotation of the cylinders proceeds further the roller 126 rocks lever 128 clockwise as viewed in Fig. 1 causing pawl 132 to engage a tooth 30 of the ratchet 32 and thereby move the ratchet clockwise through an angle slightly greater than the spacing of the teeth. It may be noted that even though the key may be released at this time it will not yet rise because of the engagement of its turned end 88 with the selector.

Before the pawl 132 moves in its return stroke to release the ratchet the cam 350 rocks the lever 342 clockwise against the tension of spring 346 and forces the link 354 into engagement with the link 18 thereby releasing the pawl 24 which drops in position to engage the tooth 30 next to that which was engaged prior to the initiation of the operation of the machine. Following such release of the pawl 24 to its active position the pawl 132 will withdraw. As the lever 342 rocks clockwise the upper roller 340 is moved away from roller 370 so as to provide a free path for the advance of the strip. It may be noted that since the key which has been depressed cannot rise, the link 18 cannot drop to again engage the opening in the pawl 24. At this time the hook 22 rides against the upper portion of the end of the pawl against which it is urged by the spring 20. Immediately after the cam 350 causes a clockwise movement of the lever 342 it engages the segment 362 rotating it counterclockwise against the tension of spring 364 so that a clockwise movement of the pinion 366 and roller 370 occurs bringing the projection 372 beyond the hook of the latching lever 374. As a result, even after the segment 362 is released by the cam 350 counterclockwise movement of the roller 370 is prevented by engagement of the projection 372 in the hook of 374. 374 is only tripped at the end of the cycle of operation as will be noted hereafter.

At about this time the printing plate 188 is approaching the position to engage the end of the ticket strip, the uppermost portion of which is approximately at the line of centers of the two cylinders where cutting previously took place. Just prior to engagement of the plate 188 with the ticket, the plate being inked by contact with roller 394, the spring 332 swings the plate 322 towards the cylinder 150 in which position it remains for a short interval so that as the ticket strip advances it will be stripped from the cylinder 150 and guided towards the exit. The plate 322 again moves away from the cylinder 150 before its position is reached by the advancing end of the type plate 188. As the ticket strip advances because of the clamping engagement between the two cylinders the finger 280 yields against the tension of the spring 284 to the position illustrated in construction lines in Fig. 2 permitting the strip to move freely forwardly. As the rotation proceeds further the timing head 190 prints upon the ticket.

During the rotation of the cylinder 146, if there is sufficient ticket stock to provide the ticket being issued, the finger 288 is held in a clockwise position retracting the link 294. Accordingly the disc 300 is rotated causing a record to be made on the counter 320.

As the end of the revolution of the cylinders approaches, since the pin 38 is still free because the segment is still displaced through the angular distance of one tooth from its initial position, the extension 52 does not lie in a position to engage the lever 108. Accordingly the lever 108 is free to pass without disengagement of the clutch and accordingly a second revolution may occur.

During the first revolution the knife actuating lever 170 was held in its extreme clockwise position by the spring 174. As the end of the first revolution approaches the pin 180 engages the cam head 178 of this lever rocking it counterclockwise.

In the construction of the machine in the form now being described the spring 174 is weak so that even though it should happen to swing the lever 170 clockwise as soon as the pin 180 clears the cam surface 178 nevertheless it will be ineffective to move the knife to cut the ticket strip because of the greater tension of spring 166 which still holds the knife retracted. It is to be noted that there are provided on the cam 104 three lobes corresponding to the three sockets 106 of the clutch. The angular positions of the lobes with respect to the sockets are such that although a lobe will engage the roller after the cam 178 has been cleared by the pin 180, nevertheless such engagement will only occur after the end 160 of the knife has passed downwardly beyond the position of the cam 178. Accordingly even though a lobe will rock the lever 170 positively in a clockwise direction such movement will occur too late to cause the knife to move in a cutting stroke. In the operation of the machine illustrated if the spring 174 is sufficiently strong to rock the lever 170 clockwise the engagement of a lobe with 176 may not occur at all since the lever will rock clockwise as soon as the end of the knife 160 clears the cam 178. The spring, however, is not depended upon to provide this action but is provided primarily only to hold the lever 170 in its extreme clockwise position after it has been moved to this position by the cam 104.

In the meantime as the initial position is being passed the lever 162 is still in its clockwise position and accordingly it does not engage the latch 374 so that the segment 362 still remains in its tensioned condition under the action of spring 364.

After the timing head has disengaged the ticket so that feeding ceases, the roller 340 rides off ledge 351 of cam 350 and rests against the ticket which is projecting outwardly. In the meantime, since the ticket strip is released, the action of finger 280 in a hole therein may impart to it a slight retrograde movement serving to align it for the next printing. A similar action occurs at the end of the last cycle aligning it for cutting.

The second revolution for the issuance of the second ticket length is now under way. During this revolution various events occur in the same fashion as in the first revolution except that certain parts remain in the positions in which they were located during the first revolution, namely, the depressed key and the link 18, the pawl 24 remaining in operative position in engagement with the proper tooth 30. When movement of link 354 occurs it is an idle one. The roller 340 is again lifted so that the advance of the strip is not hindered.

During this second revolution the pawl 132 advances the ratchet 32 another step. In this case, however, the pin 38 is engaged and accordingly the lever 46 is raised bringing the extension 52 into the path of the clutch lever 108. The detent 24 now engages the tooth originally engaged. The key 4 is now free to rise and the hook end of the lip 18 enters the opening in the detent 24.

As the ratchet 32 moves to its initial position the switch 62 opens so that the motor is deenergized. The cycle of the machine, however, is completed by the overrun of the motor.

As the gear 124 approaches its final position the pin 125 engages the lever 46, rocking it downwardly against the action of the strong spring 48, and eventually snaps into the socket 50 which brings the gear to rest in its final position. As this final position is approached the pin 180 again engages the cam 178 and rocks the lever 170 counterclockwise. As 146 comes to rest in its initial position the pin 180 clears the cam 178 and the movable knife 152 is lined up with respect to the fixed knife 158. The clutch is now disengaged with the result that, although the hub 112 has stopped, the hub 100 continues to revolve due to the overrun of the motor. As it does so one of the lobes of the cam 104 which has hitherto been rotating with the gear 124 moves around engaging the roller 176 thereby rocking the lever 170 clockwise in a positive fashion and causing the cam 178 to engage the knife 152 moving it positively in its cutting stroke. As the knife 152 advances, the lever 162 is moved counterclockwise by the extension 160, and, as the severing of the strip is finished, the cam-shaped upper end 380 of the lever 162 trips the detent 374 releasing the projection 372 so that the roller 370 is rapidly rotated in a counterclockwise direction by the action of the spring 364. Since in the meantime the roller 340 has dropped into contact with the ticket strip, the two rollers rotate together and both tickets are snapped out of the machine. This snapping is further effected by the fact that as the lower end of the ticket passes from between the rollers, the roller 340 drops further inwardly into the groove in the roller 370. Normally this machine will not have a ticket located between the rollers 340 and 370, this ticket being merely illustrated in the drawings for the purpose of indicating the position of the ticket just as it is being issued.

Before the cylinder 150 comes to its initial position following any revolution, the ticket strip will have been released by the rearmost printing surface which in this case is that of the dating and timing mechanism. The untensioned strip is then lined up properly by the action of the finger 280 which will have previously been displaced slightly upwardly with its end projecting into a hole in the strip. Accordingly, the strip is lined up between revolutions of the cylinder to insure proper printing, and after the last revolution of a cycle to insure cutting at the proper place.

It may be noted that if the key is forcibly held down the machine will not continue to operate. To secure successive operations it is necessary to first release the key so that the hook end 22 of the link 18 may drop in position to enable it to raise the detent 24. This acts as an insurance against the accidental issue of more tickets than are desired due to an accidental prolonged holding down of a key. This is particularly important since the machine acts with great rapidity and even a very slight prolonged depression of a key might cause a renewed cycle of operation in case provisions of the type just described were not made.

By reason of the arrangement provided for the operation of the time printing mechanism, it will be seen that this mechanism will operate even though an impulse is given at the time one of the units is in operation. This is because even though a pin 226 may not revolve with the corresponding type cylinder, engagement of the arm 224 with the shoulder of the pin 226 is not disturbed, this shoulder being concentric with the axis of revolution.

It is usually preferable to sever a series of tickets only after the last has been issued. The machine, however, may be readily modified to sever the tickets and eject them individually. To accomplish this it is only necessary to provide a relatively weak spring 166 and a strong spring 174, preferably arranged at a more advantageous angle than that shown. In such case the knife will be yieldingly moved to cut the ticket strip upon each revolution of the cylinders irrespective of the operation of the cam 104. Also, in such event, the lever 162 will operate to trip the latch 374 with the result that the roller 370 will eject the individual tickets. As an alternative to this, the lobes of the cam 104 may be advanced relatively to the sockets 106 so that while the clutch is engaged the lever 170 will be rocked early enough to actuate the knife at the end of every revolution of the cylinder.

Various other modifications may be made in the mechanism heretofore described while still adhering to the key operation. These changes are primarily concerned with the variations in the layout of the printing cylinder. Instead of the date and time printing head, or in addition to this, there may be provided a numbering head which can be advanced in any suitable fashion, for example, by the provision of an extending arm adapted to engage a fixed pin carried by one of the plates of the machine frame so as to advance the numbering head a unit upon each revolution. Better still, however, would be an arrangement in which the lever 290 was provided with an extension which would advance the numbering head only at such times as the lever occupied a clockwise position as viewed in Fig. 1 due to the presence of a ticket ready to be issued. In such case the numbers in the numbering head could be made to correspond with the numbers on the counter so that idle revolutions of the mechanism would neither advance the numbering head nor the counter.

In the machine as already described feeding of the ticket strip takes place only by contact therewith of the printing plates. If it is desired to print and also advance the ticket to an extent in excess of the printing length lateral flanges may be provided on the sides of the printing plates and extending beyond their limits in such positions that while they will engage the edges of the ticket strip they will not be inked and will accordingly function only as feeding members.

If it is desired to issue preprinted tickets without any additional printing matter the simplest method of accomplishing this is merely to remove the inker leaving in the machine a printing cylinder carrying a plate. The plate will then serve to feed without, however, printing. Alternatively, feeding flanges can be provided on a special cylinder for advancing the strip without printing.

Inasmuch as the keys are independent of each other certain of them can be removed without effecting the proper operation of the machine under the control of the others. For example, if the machine is to issue only a single ticket at a single operation then all of the keys except that corresponding to the issue of one ticket may be removed.

One of the most important modifications of the machine is that illustrated in Fig. 10 which represents the machine already described converted so as to operate to issue a ticket if the one which is in presented position is removed. Fig. 10 represents the machine of Fig. 1 from which various parts have been removed to render it independent of key control and to which one extra part has been added to produce the operation just indicated. While the keys are indicated in Fig. 10 they would, of course, be normally removed for the sake of appearance if the machine is to operate as a restaurant check machine, or the like, in the manner indicated.

To produce this modified form of the machine connections between the segment 32 and the keys are removed. Furthermore there is removed either only the spring 364 (Fig. 1) or the various connecting elements between this spring and the backing roller, the latter being retained. The purpose of such removal is to prevent tickets from being ejected which, in the modified form of the machine, would result in the continuous feeding of tickets.

One addition is the substitution of the pawl 420 for the pawl 24, this pawl 420 being controlled by the spring 26 heretofore used and cooperating with the hook 358 of the link 354 which was previously used only for the purpose of disengaging the lifting link 18.

The only other addition is that of a stop screw 422 which may be tapped into the side plate of the frame and which prevents the segment 32 from rocking counterclockwise to an extent in excess of the angular spacing of a pair of adjacent teeth 30.

Assuming a ticket in position between the rollers 340 and 370 as illustrated, the roller 340 will be held slightly clockwise from its extreme position so that the end of lever 342 is held away from the lower portion of the cam 350. When the ticket is removed the roller 340 can move into the groove in the roller 370 under the action of the spring 346 and causes the link 354 to trip the pawl 420 from engagement with the ratchet 32. The ratchet then swings to the left under the action of spring 60 as heretofore, initiating a cycle of operation of the machine which takes place in the fashion already described. In this case, however, only a single revolution of the cylinders may occur. At the end of the cycle a ticket projects upwardly between the rollers 340 and 370 ready for removal to initiate a subsequent cycle of operation. The change from one type of machine to the other is a matter of only a few minutes. This of course is not the important relationship between the two machines which is primarily that they are made of substantially the same parts with the result that the cost of production may be very considerably lowered. In fact, as already indicated the only two parts which must be added to form the machine of Fig. 10 are those indicated at 420 and 422 the cost of which is very low.

The machine of Fig. 10 is of course subject to the various changes indicated above in connection with the key controlled machine. That is, the machine may be used to print blank stock or partially preprinted stock or alternatively preprinted tickets may be issued without any printing action in the machine.

In both types of machine tickets may be issued carrying duplicate coupons or the like which may be formed merely by proper arrangement of printing surfaces upon the printing cylinder. The printing cylinder may also carry a punching arrangement for producing serrations along which the tickets which are issued may be severed as required, there being provided in such case corresponding depressions in the backing cylinder. There may also be provided punching mechanism in the form of validating devices for marking the tickets to indicate definitely that they have been issued from the machine. Of course when printing takes place this would generally be unnecessary since the presence or absence of printed matter on the tickets would serve as an indication of their validity.

Certain features of the invention herein described are claimed in a divisional application, Serial No. 124,176, filed Feb. 5, 1937.

It will be clear that numerous variations may be made in specific details without departing from the invention as defined in the claims.

What I claim and desire to protect by Letters Patent is:

1. A ticket issuing machine comprising means for delivering at least one ticket in a cycle of operation; a member controlling the cycle of operation urged in one direction by a spring; a detent holding said member in opposition to the spring; an element operable to disengage the detent from the member to release it for movement by the spring; means arranged to engage the ticket; devices for moving said means to prevent its engagement with an advancing ticket; and connections whereby the element is moved to cause the detent to assume its operative position when said last named means is moved to prevent its engagement with an advancing ticket.

2. A ticket issuing machine including means for feeding a ticket strip, said means including a rotary feeding member; means effective to lock said member in a predetermined position at the end of a cycle of operation; a knife mounted for movement upon and relatively to the member and adapted to sever the strip; and means for positively moving the knife in its cutting movements after said member is located in said predetermined position.

3. A ticket issuing machine including means for feeding a ticket strip, said means including a rotary feeding member; a knife mounted for movement upon and relatively to the member and adapted to sever the strip; and means for positively moving the knife in both its cutting and retracting movements.

4. A ticket issuing machine including means for feeding a ticket strip, said means including a rotary feeding member; means effective to locate said member in a predetermined position at the end of a cycle of operation; a knife mounted for movement upon and relatively to the member and adapted to sever the strip; and means for moving the knife in its cutting movements after said member is located in said predetermined position, said last means including a lever having a fixed axis.

5. A ticket issuing machine including means for feeding a ticket strip, said means including a rotary feeding member; a knife mounted for movement upon and relatively to the member and adapted to sever the strip; and means for positively moving the knife in its cutting movements, said last means including a cam operated lever having a fixed axis.

6. A ticket issuing machine including means for feeding a ticket strip, said means including a rotary feeding member; a knife mounted upon and rotatable with the member and adapted to sever the strip; and means for moving the knife in its cutting movements, said last means including a lever, a cam arranged to impart knife actuating movements to the lever, and means whereby, during the operation of the machine to issue a plurality of tickets, the cam acts upon the lever to move it at a time following the issue of the last ticket of a series.

7. A ticket issuing machine including means for feeding a ticket strip, said means including a rotary feeding member; a knife rotatable with the member and adapted to sever the strip; a driving element; a clutch between the driving element and said member; a cam carried by the driving element; and devices actuable by the cam to impart cutting movements to the knife; said cam moving, when the clutch is engaged, in such timed relationship with the feeding member that it actuates said devices without imparting cutting movements to the knife, but moving when the clutch is disengaged to actuate said devices to impart cutting movements to the knife.

8. A ticket issuing machine including means for feeding a ticket strip, said means including a rotary feeding member; a knife mounted for movement upon and relatively to the member and adapted to sever the strip; and means for moving the knife in its cutting movements only when the member is at rest, said means including a cam rotatable after the member comes to rest.

9. A ticket issuing machine including means for feeding a ticket strip, said means including a rotary feeding member; a knife rotatable with the member and adapted to sever the strip; means for controlling the machine to cause it to issue a plurality of tickets in one operation; and means for moving the knife in its cutting movements only after the ticket strip has been fed sufficiently to provide such plurality of tickets.

10. A ticket issuing machine including means for feeding a ticket strip, said means including a rotary feeding member; a knife mounted for movement upon and relatively to the member and adapted to sever the strip; and means set into operation, only after the member is at rest, to engage the knife to impart cutting movements thereto.

11. A ticket issuing machine including means for feeding a ticket strip, said means including a rotary feeding member; a knife rotatable with the member and adapted to sever the strip; a motor; a clutch between the motor and member whereby the former drives the latter; and means actuated by overrun of the motor following disengagement of the clutch for moving the knife in its cutting movements.

12. A ticket issuing machine including means for feeding a ticket strip; means for severing tickets from a strip; a motor; a clutch between the motor and feeding means whereby the former drives the latter; and means for ejecting a ticket from the machine after severance from the strip; said means including an element engageable with the ticket and devices for actuating said element only after severing takes place to eject a ticket, said devices being set into operation by the motor following disengagement of the clutch.

13. A ticket issuing machine including means for feeding a ticket strip; a motor; a clutch between the motor and feeding means whereby the former may drive the latter; means for causing the machine to issue a series of tickets in one operation; means for severing the tickets from the strip only after the strip has been fed to issue the last ticket of the series; and means operating to eject the tickets after disengagement of the clutch.

14. A ticket issuing machine including a pair of cylinders one of which carries projecting elements arranged to engage and feed a ticket strip by clamping it against the other cylinder; and a member swinging to a position within the radius of the active surface of a projecting element prior to its reaching the member to separate the leading end of the ticket strip from the first cylinder, and swinging away from the first cylinder thereafter to clear said projecting element.

15. A ticket issuing machine including a pair of cylinders one of which carries projecting elements arranged to engage and feed a ticket strip by clamping it against the other cylinder; and a member swinging to a position within the radius of the active surface of a projecting element prior to its reaching the member to separate the leading end of the ticket strip from the first cylinder, and swinging away from the first cylinder thereafter to clear said projecting element; said member being swung by the action of a cam rotating with the first cylinder.

16. A ticket issuing machine comprising means for guiding a ticket strip; means for severing a ticket from the strip; means for presenting a severed ticket in delivering position; means for effecting a cycle of operation of the machine including a roller having a movable axis and arranged to engage a ticket in delivering position and effective upon its removal to initiate a cycle of operation; and means for moving said roller out of the path of the advancing end of the strip during the operation of the machine.

17. A ticket issuing machine comprising means for guiding a ticket strip including a roller adjacent the point of delivery; means for severing a ticket from the strip; means for presenting a severed ticket in delivery position; means for effecting a cycle of operation of the machine including a second roller having a movable axis and arranged to engage a ticket in delivering position and effective upon its removal to drop within the periphery of the first roller to initiate a cycle of operation; and means for moving the second roller out of the path of the advancing end of the strip during the operation of the machine.

18. A ticket issuing machine including means for guiding a ticket strip during advancing movements; a member rotating when the ticket strip advances; means having driving connections with said member to be normally actuated by the member whenever the member rotates; and devices operable in the absence of a ticket strip at a given location in the machine to interrupt said driving connections.

19. A ticket issuing machine including means for guiding a ticket strip during advancing movements; a member rotating when the ticket strip advances; a counter having driving connections with said member to be normally actuated by the member whenever the member rotates; and devices operable in the absence of a ticket strip at a given location in the machine to interrupt said driving connections.

20. A ticket issuing machine including means for guiding a ticket strip during advancing movements; a member rotating when the ticket strip advances; means having driving connections with said member to be normally actuated whenever the member rotates, said connections including a yielding clutch comprising a driving element connected to the member and a driven element connected with said means, and devices operable in the absence of a ticket strip at a given location in the machine to lock said driven element to prevent its rotation by the driving element.

21. A ticket issuing machine including means for guiding a ticket strip during advancing movements; a member rotating when the ticket strip advances; a counter having driving connections with said member to be normally actuated whenever the member rotates, said connections including a yielding clutch comprising a driving element connected to the member and a driven element connected with said counter, and devices operable in the absence of a ticket strip at a given location in the machine to lock said driven element to prevent its rotation by the driving element.

22. A ticket issuing machine including means for guiding a ticket strip during advancing movements; and means continuously engaging the strip and offering little frictional resistance to forward movements thereof but substantial frictional resistance to undesired reverse movements thereof.

23. A ticket issuing machine including means for guiding a ticket strip during advancing movements; and means continuously engaging the strip and offering little frictional resistance to forward movements thereof but substantial frictional resistance to undesired reverse movements thereof, said means comprising a spring controlled finger contacting with the strip and extending in the direction of its advancing movements.

24. A ticket isuing machine including means for feeding a perforated ticket strip; and means including a spring controlled finger movable lengthwise of the strip and arranged to enter perforations in the strip to yieldingly move and adjust the strip lengthwise when it is released by the feeding means.

25. A ticket issuing machine including means for feeding a perforated ticket strip; and means including a spring controlled finger movable lengthwise of the strip and arranged to enter perforations in the strip to yieldingly move and adjust the strip lengthwise when it is released by the feeding means, the positions of the finger being adjustable whereby it may properly adjust strips whose perforations are differently spaced.

26. A ticket issuing machine including means for feeding a ticket strip, said means including a rotary feeding member; a knife rotatable with the member and adapted to sever the strip; and means for moving the knife in its cutting movements, said last means including a lever, a cam arranged to impart knife actuating movements to the lever, and means whereby, during the operation of the machine to issue a plurality of tickets, the cam acts upon the lever to move it at a time when it will not actuate the knife except following the issue of the last ticket of a series when the cam acts upon the lever and causes it to actuate the knife.

27. A ticket issuing machine including means for feeding a ticket strip a predetermined distance in a cycle of operation, said means including a rotary feeding member arranged to come to rest at the end of a cycle of operation in a given position; a knife mounted for movement upon and relatively to the member and adapted to sever the strip; and means for moving the knife in its cutting movements when the member is at rest.

28. A ticket issuing machine including means for feeding a ticket strip a predetermined distance in a cycle of operation, said means including a rotary feeding member arranged to come to rest at the end of a cycle of operation in a given position; a knife mounted for movement upon and relatively to the member and adapted to sever the strip; and means for moving the knife in its cutting movements only when the member is at rest.

29. A ticket issuing machine including means for feeding a ticket strip a predetermined distance in a cycle of operation, said means including a rotary feeding member arranged to come to rest at the end of a cycle of operation in a given position; a knife rotatable with the member and movable radially of the member to sever the strip; and means for moving the knife in its cutting movements when the member is at rest.

30. A ticket issuing machine comprising means for delivering one or more tickets in a cycle of operation; a plurality of pivoted key levers, each of said key levers being provided with a shoulder; a motor; a member provided with a plurality of steps, each of which is arranged to engage the shoulder of one of said key levers when the corresponding key lever is actuated; a spring urging said member towards shoulder engaging position; a detent arranged to restrain said member from movement under the action of the spring; means actuated by pivotal movement of any of said key levers to disengage the detent to free said member for movement by said spring; means for imparting a step by step return movement to the member upon the issuance of each ticket; means for holding the actuated key lever in its active position during the issue of successive tickets; means for releasing the detent during the issue of the first ticket to enable it to hold said member in positions to which it is returned step by step; and means controlled by the actuated key for causing the motor to actuate the ticket delivering means.

31. A ticket issuing machine comprising means for delivering one or more tickets in a cycle of operation; a motor; a plurality of pivoted key levers; a member, said member and key levers being provided with engageable shoulders and steps whereby when any of said key levers is actuated, the member may engage it in one of a plurality of positions corresponding to the key lever which is actuated and the number of tickets to be issued; a spring urging said member towards such positions; a detent arranged to restrain said member for movement under the action of the spring; means actuated by pivotal movement of any of said key levers to disengage the detent to free said member for movement by said spring; means for imparting a step by step return movement to the member upon the issuance of each ticket; means for holding the actuated key lever in its active position during the issue of successive tickets; means for releasing the detent during the issue of the first ticket to enable it to hold said member in positions to which it is returned step by step; and means controlled by the actuated key for causing the motor to actuate the ticket delivering means.

32. A ticket issuing machine comprising means for delivering one or more tickets in a cycle of operation; means for determining the number of tickets to be issued in a cycle; a knife; a pushing member adapted to engage the knife to move it in its cutting stroke; and means whereby the pushing member is moved as each ticket is issued, said pushing member failing to engage and move the knife during its movements until the last ticket of a series is issued whereupon the pushing member engages the knife to move it in a cutting stroke.

33. A ticket issuing machine comprising means for delivering one or more tickets in a cycle of operation; means for determining the number of tickets to be issued in a cycle; a knife; a pivoted lever; a knife pushing element carried by the lever and adapted to engage the knife to move it in its cutting stroke; and a cam adapted to positively rock the lever as each ticket is issued, said knife pushing element failing to move the knife during its movements when the lever rocks until the last ticket of the series is issued whereupon the element engages the knife to move it in a cutting stroke.

34. In ticket issuing apparatus, the combination of a feed drum, drive means therefor, including a clutch having a throwout member rotating therewith, a trip engageable with said throwout member to effect release of the clutch and stoppage of the parts in a predetermined position, said trip being shiftable into and out of the path of movement of said throwout, a clutch control member for holding said trip in the clutch releasing position and shiftable to permit movement of said trip out of said clutch releasing position, a plurality of keys each of which may effect simultaneous movements of said control member and trip out of said clutch releasing position, cooperating stop means individual to said keys between each of said keys and said control member governing extent of movement of said control member out of the clutch releasing position, and step by step mechanism operating in synchronism with the feed drum for picking up the control member in the shifted position and for restoring it to the clutch releasing position.

35. In ticket issuing apparatus, the combination of a feed drum, drive means therefor, including a clutch having a throwout member rotating therewith, a trip engageable with said throwout member to effect release of the clutch and stoppage of the parts in a predetermined position, said trip being shiftable into and out of the path of movement of said throwout, a clutch control member for holding said trip in the clutch releasing position and shiftable to permit movement of said trip out of said clutch releasing position, a plurality of keys each of which may effect movement of said control member out of said clutch releasing position, cooperating stop means individual to said keys between each of said keys and said control member governing extent of movement of said control member out of the clutch releasing position, step by step mechanism operating in synchronism with the feed drum for picking up the control member in the shifted position and for restoring it to the clutch releasing position, a motor forming part of the drive means, a switch for controlling said motor, means operable by said keys for throwing said switch to on position and means on the control member for effecting throw of the switch to off position simultaneously with the restoration of the control member to the clutch releasing position.

36. In ticket issuing apparatus, the combination of a feed drum, drive means therefor, including a clutch having a throwout member rotating therewith, a trip engageable with said throwout member to effect release of the clutch and stoppage of the parts in a predetermined position, said trip being shiftable into and out of the path of movement of said throwout, a clutch control member for holding said trip in the clutch releasing position and shiftable to permit movement of said trip out of said clutch releasing position, a plurality of keys each of which may effect movement of said control member out of said clutch releasing position, cooperating stop means individual to said keys between each of said keys and said control member governing extent of movement of said control member out of the clutch releasing position, step by step mechanism operating in synchronism with the feed drum for picking up the control member in the shifted position and for restoring it to the clutch releasing position, the aforesaid keys comprising depressible independently mounted key levers, means for locking said keys in depressed position, and means for automatically releasing said locking means approximately at the completion of the predetermined cycle.

37. In ticket issuing apparatus, the combination of a feed drum, drive means therefor, including a clutch having a throwout member rotating therewith, a trip engageable with said throwout member to effect release of the clutch and stoppage of the parts in a predetermined position, said trip being shiftable into and out of the path of movement of said throwout, a clutch control member for holding said trip in the clutch releasing position and shiftable to permit movement of said trip out of said clutch releasing position, a plurality of keys each of which may effect simultaneous movements of said control member and trip out of said clutch releasing position, cooperating stop means individual to said keys between each of said keys and said control member governing extent of movement of said control member out of the clutch releasing position, step by step mechanism operating in synchronism with the feed drum for picking up the control member in the shifted position and for restoring it to the clutch releasing position, the aforesaid keys comprising depressible independently mounted key levers, said cooperating stop means including sequentially arranged stops on the control member, and the key levers having duplicate stop shoulders cooperable respectively with the sequential stop shoulders of the control member.

38. In ticket issuing apparatus, the combination of a movable selector member provided with ratchet teeth, a dogging pawl therefor, key controlled mechanism for effecting release of said dogging pawl, a spring controlled restoring pawl, means for stepping the same to restore the selector bar and means for effecting release of the dogging pawl from the key actuated mechanism to enable said pawl to remain thereafter in engagement with the selector and to operate as a holding pawl for the selector throughout the return stepping operations of the same.

39. In ticket issuing apparatus, the combination of ticket feed mechanism, a selector governing operation of the same, a trip pawl for releasing said selector, key actuated mechanism for operating said pawl and including a connection shiftable to free said pawl to act as a holding pawl for the selector, means operating in timed relation with said ticket feed mechanism for shifting said connection and means comprising a spring controlled pawl operating in timed relation with the feed mechanism for restoring the selector while so held by said trip pawl.

40. In ticket issuing apparatus, ticket feed mechanism, a shiftable selector governing operation of the same, a trip pawl for said selector, a single set of key levers determining the extent of movement of said selector, a universal bar actuated by any of said levers, a link carried by said universal bar and shiftable into and out of operating relation in respect to said trip pawl and means operating in timed relation to said feed mechanism, controlling shifting of said link into and out of operative relation with said trip pawl.

41. In ticket issuing apparatus, motor driven ticket feed mechanism, a switch for effecting starting and stopping of said motor driven feed mechanism, key levers, a universal bar arranged to be engaged upon movement of any of said key levers and arranged to close said switch when so engaged, means controlling restoration of said universal bar to the switch off position and means in timed relation with the ticket feed mechanism for preventing restoration of said universal bar prior to completion of functions of the motor driven mechanism.

42. In ticket issuing apparatus, ticket feed mechanism, a shiftable selector governing operation of the same, a trip pawl for said selector, a single set of key levers, means whereby said key levers control the extent of movement of said selector to determine the issue of varying numbers of tickets, a universal bar actuated by the key levers, a link carried by said universal bar and shiftable into and out of operating relation in respect to said trip pawl, and means operating in timed relation to said feed mechanism controlling shifting of said link into and out of operative relation with said trip pawl.

43. A ticket issuing machine comprising means for delivering one or more tickets in a cycle of operation; means for determining the number of tickets to be issued in a cycle; a knife; a pushing member adapted to engage the knife to move it in its cutting stroke; means whereby the pushing member has imparted to it strokes of substantially the same extent as each ticket is issued; and means whereby the pushing member is caused to fail to engage and move the knife during its movements until the issue of the last ticket of a series whereupon it is caused to engage the knife to move it in a cutting stroke.

44. A ticket issuing machine including means for engaging and feeding a ticket strip having holes between ticket portions thereof, and means for engaging a hole in the strip to move it lengthwise to adjust its position when it is not engaged by the feeding means, said engaging means yielding to permit portions of the ticket strip between the holes to pass the engaging means while the engaging means yieldingly rides thereon.

45. A ticket issuing machine for delivering one or more tickets from a strip in a cycle of operation, said machine comprising means for selectively determining simultaneously with initiation of a cycle of operation the number of tickets to be issued in a cycle, means for engaging and feeding the ticket strip, and means for moving the strip lengthwise to adjust its position when it is not engaged by the feeding means.

46. A ticket issuing machine for delivering one or more tickets from a strip in a cycle of operation, said machine comprising means for selectively determining simultaneously with initiation of a cycle of operation the number of tickets to be issued in a cycle, means for severing the strip, means for engaging and feeding the ticket strip, and means for moving the strip lengthwise to adjust its position when it is not engaged by the feeding means and prior to severing.

REUBEN H. HELSEL.